2,964,378
Patented Dec. 13, 1960

2,964,378

LOW TEMPERATURE PREPARATION OF ALKALI METAL BOROHYDRIDES FROM METAL HYDRIDES AND ALKYL BORATES IN SOLUTION

Herbert C. Brown, Lafayette, Ind., and Herman I. Schlesinger, Chicago, Ill. (Both % Callery Chemical Co., 201 N. Braddock Ave., Pittsburgh 8, Pa.)

No Drawing. Filed June 3, 1955, Ser. No. 513,164

4 Claims. (Cl. 23—14)

This invention relates to a new and improved process for the preparation of alkali metal borohydrides ($MBH_4$) and more particularly to the preparation of alkali metal borohydrides by the reaction of alkali metal hydrides (MH) and trialkyl borates [$B(OR)_3$] in solution in various solvents at moderate temperatures.

Alkali metal borohydrides such as sodium, lithium and potassium borohydrides are relatively new compounds which have become commercially available only in recent years. Sodium and lithium borohydrides have become important as selective reducing agents and also as intermediates in the preparation of diborane and other boron containing compounds. Several methods for preparing alkali metal borohydrides have been developed and reported in the literature and patented by us. One of the earliest methods which we reported for the preparation of alkali metal borohydrides is described in our Patent 2,461,661 in which we reported the preparation of sodium borohydride by reaction of sodium trimethoxyborohydride ($NaBH(OCH_3)_3$) with diborane ($B_2H_6$). In our Patents 2,461,662 and 2,461,663 we reported the preparation of alkali metal borohydride such as sodium borohydride by the reaction of sodium methoxide ($NaOCH_3$) and sodium tetramethoxyborate

respectively with diborane. Still later in Patent 2,534,533 we reported the preparation of sodium borohydride by the reaction: $4NaH + B(OCH_3)_3 \rightarrow NaBH_4 + 3NaOCH_3$. This reaction however requires the use of a 4 to 1 molar ratio of sodium hydride to trimethyl borate and furthermore requires the use of temperatures above 200° C. and preferably on the order of 275° C.

It is therefore one object of this invention to provide a new and improved method for preparing alkali metal borohydrides by reaction of alkali metal hydrides and trialkyl borates at relatively low temperatures.

Another object of this invention is to provide a new and improved method for preparing alkali metal borohydrides in liquid reaction media at temperatures of the order of the reflux temperature of the liquid or lower.

Another object of this invention is to provide a new and improved method for preparing alkali metal borohydrides by reaction of an alkali metal hydride and a trialkyl borate in proportions favoring the formation of a trialkoxy borohydride in a liquid reaction medium in which the trialkoxy borohydride is soluble and followed by disproportionation of the trialkoxyborohydride to produce the borohydride.

Another object of this invention is to provide a new and improved method for preparing alkali metal borohydrides by reaction of alkali metal hydrides and trialkyl borates in ether type solvents such as polyethylene glycol dialkyl ethers, tetrahydrofuran, dioxane and lower dialkyl ethers.

Other objects of this invention will become apparent from time to time throughout the specification and claims as hereinafter related.

This invention comprises our new and improved process for preparing alkali metal borohydrides which will be described more fully hereinafter and the novelty of which will be particularly pointed out and distinctly claimed.

This invention is based upon our discovery that when an alkali metal hydride (MH) is reacted with a trialkyl borate [$B(OR)_3$] in proportions favoring the formation of a trialkoxyborohydride [$MBH(OR)_3$] in a solvent for the trialkoxyborohydride in which solvent the borohydride or the corresponding tetraalkoxyborate [$MB(OR)_4$] is insoluble a substantial yield of borohydride ($MBH_4$) is formed. If the borohydride is insoluble in the solvent used it is precipitated from the reaction mixture and separated therefrom. If the by-product alkali metal tetraalkoxyborate is insoluble in the solvents used the alkali metal borohydride is recovered by evaporation of the solvent. When the alkali metal hydride and trialkyl borate are heated in a solvent in which the alkali metal trialkoxyborohydride is soluble the trialkoxyborohydride is apparently formed as an intermediate which disproportionates into the alkali metal borohydride and the alkali metal tetraalkoxyborate. This disproportionation in solution takes place at a much lower temperature than does the corresponding disproportionation in the solid phase. For optimum yields and optimum purity of product using this process it is preferred that a solvent be used in which the alkali metal trialkoxyborohydride and the alkali metal tetraalkoxyborate are both soluble while the alkali metal borohydride is insoluble. When the reaction is carried out in such a solvent the alkali metal borohydride is precipitated from the reaction mixture and there is left in solution a mixture of the alkali metal trialkoxyborohydride and the alkali metal tetraalkoxyborate. This process proceeds according to the reaction:

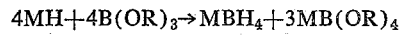

where M is an alkali metal and R is an alkyl group.

The apparatus used for studying this reaction consisted of a large round-bottomed flask equipped with an agitator and connected to a reflux condenser. The flask was provided with a thermometer for measuring the reaction temperature and was connected to a nitrogen cylinder to sweep out the air from the flask before starting the reaction. After the reaction was carried out for several hours the mixture was then either evaporated to dryness or filtered, the residue weighed, and a portion extracted with liquid ammonia. The extract was weighed and analyzed for borohydride by standard analytical procedures.

In one experiment a mixture of 1.1 gram mols of sodium hydride and 1.1 gram mols of trimethyl borate was placed in a reaction flask. One hundred ml. of tetrahydrofuran were added to the slurry of sodium hydride and trimethyl borate. The mixture was thoroughly agitated and heated in the temperature range from 25 to 65° C. At the end of three hours the reaction slurry was removed from the flask and filtered. The filter cake was extracted with liquid ammonia and filtered from the residue which consisted of insoluble decomposition products. The ammonia extract was analyzed by conventional analytical methods and found to contain substantially pure sodium borohydride in a yield of 54% based on the sodium hydride reacted.

In another experiment using the same type of apparatus 1.22 gram mols of sodium hydride and 1.0 gram mol of trimethyl borate were added to the reaction flask together with 200 ml. of tetrahydrofuran. The mixture was heated at 65° C. for three hours and the reaction slurry filtered and extracted as described in connection with the previous experiment. The ammonia extract from the filter cake analyzed as substantially pure sodium borohydride in a yield of 42.8% based upon the sodium hydride reacted. In each of these experiments the filtrate from the reaction mixture was found to consist of a mixture of sodium trimethoxyborohydride and sodium tetramethoxyborate dissolved in tetrahydrofuran.

In still another experiment 0.1 gram mol of sodium hydride was reacted with a stoichiometric amount of trimethyl borate in 100 milliliters of dioxane. The mixture was refluxed at 101° C. and thoroughly mixed for a period of 24 hours. At the end of this time the solution was evaporated to dryness. The residue was weighed and a measured portion was extracted with liquid ammonia. The extract was weighed and analyzed for borohydride by standard analytical procedures. The product of this reaction was found to be sodium borohydride of a purity of about 22% and in a yield representing about 36% based upon the sodium hydride reacted.

In still another experiment sodium hydride and triethyl borate were placed in a reaction flask together with 100 milliliters of tetrahydrofuran. In this reaction .06 gram mol of sodium hydride were reacted with a stoichiometric amount of triethyl borate. The reaction slurry was refluxed at 65° C. for a period of 24 hours. At the end of this time the reaction mixture was evaporated to dryness, the residue weighed, and a portion extracted with liquid ammonia. The extract was weighed and analyzed for borohydride and found to contain sodium borohydride of about 74% purity in an amount corresponding to a yield of about 38.5% based upon the sodium hydride reacted.

In still another experiment sodium hydride and tricyclohexyl borate were reacted in tetrahydrofuran and after following the same procedure used in the other experiments sodium borohydride was found to be present in a very small yield.

In still another experiment 0.2 gram mol of lithium hydride were reacted with a stoichiometric amount of trimethyl borate in di-n-butyl ether. This reaction mixture was refluxed at 100° C. for a period of 24 hours and the product separated and identified as in the preceding experiments. The product of the reaction was found to be lithium borohydride of a purity of about 33% and in a yield of about 29% based upon the lithium hydride reacted.

In still another experiment 0.2 gram mol of lithium hydride were reacted with a stoichiometric amount of trimethyl borate in 100 milliliters of tetrahydrofuran. The reaction mixture was refluxed at 65° C. for about 24 hours. At the end of this time the reaction products were separated and identified as in the preceding experiments. The reaction product was found to contain lithium borohydride of a purity of about 23% in a yield of about 25% based upon the lithium hydride reacted.

In still another experiment 0.1 gram of potassium hydride was reacted with a stoichiometric amount of trimethyl borate in 100 milliliters of tetrahydrofuran. The reaction mixture was refluxed at 65° C. for a period of about 24 hours. At the end of that time the reaction products were separated and identified as in the preceding experiments. The products of the reaction were found to include potassium borohydride of a purity of about 51% in a yield of about 27% based upon the potassium hydride reacted.

In another series of experiments sodium hydride and trimethyl borate were reacted in stoichiometric proportions in diethylene glycol dimethyl ether $$(CH_3O(C_2H_4O)_2CH_3)$$

following the procedure outlined for the preceding experiments. The principal reaction products were $NaBH_4$, $NaBH(OCH_3)_3$ and $NaB(OCH_3)_4$. It should be noted, however, that the temperature-solubility curves for $NaBH_4$ and $NaB(OCH_3)_4$ in diethylene glycol dimethyl ether are reversed. From room temperature to 100° C. the solubility of $NaBH_4$ decreases and that of $$NaB(OCH_3)_4$$

increases. When this reaction is carried out at about 90° C. the $NaBH_4$ is precipitated from the reaction mixture and the $NaBH(OCH_3)_3$ and $NaB(OCH_3)_4$ remain in solution. When this reaction is carried out at lower temperatures (about 35–40° C.) the $NaBH_4$ and $NaBH(OCH_3)_3$ remain in solution and the $NaB(OCH_3)_4$ is precipitated.

In these and other experiments it was found that the reaction of alkali metal hydrides and trialkyl borates to produce alkali metal borohydrides may be carried out at a much lower temperature than was previously believed possible. This reaction can be carried out at these low temperatures when the reaction is carried out in a solvent in which the trialkoxyborohydride is soluble and in which one of the ultimate reaction products, the alkali metal borohydride or alkali metal tetraalkoxyborate, is insoluble. While the reaction is found to go satisfactorily at the reflux temperature of the various solvents used it is possible to obtain the benefit of a higher reaction rate by carrying out the reaction at slightly higher temperatures. In the case of some of the more volatile solvents which appear to produce a better yield and purity of product it would be necessary to carry out the reaction under pressure if it were desired to obtain the benefit of a higher reaction temperature.

Having thus described our invention fully and completely and including several modes of practicing our invention it should be understood that within the scope of the appended claims this invention may be practiced otherwise than as specifically described.

What we desire to claim and secure by Letters Patent of the United States is:

1. A method for preparing alkali metal borohydrides which comprises heating an alkali metal hydride and trimethyl borate in the proportion of about one mole of alkali metal hydride to about one mole of trimethyl borate in a liquid ethereal medium selected from the group consisting of diethylene glycol dimethyl ether, tetrahydrofuran, and di-n-butyl ether at a temperature sufficiently high to form an alkali metal trimethoxyborohydride but not substantially higher than about 100° C., then heating the reaction liquor at a temperature between about 35° C. and 100° C. for a period of time sufficient to cause the alkali metal trimethoxyborohydride to disproportionate to form an alkali metal borohydride and an alkali metal tetraalkoxyborate, and separating the alkali metal borohydride thus formed from the alkali metal tetraalkoxyborate.

2. The method as claimed by claim 1 wherein the alkali metal hydride is sodium hydride.

3. The method as claimed by claim 2 wherein the liquid ethereal medium is tetrahydrofuran.

4. The method as claimed by claim 2 wherein the liquid ethereal medium is diethylene glycol dimethyl ether.

References Cited in the file of this patent

UNITED STATES PATENTS

| | | |
|---|---|---|
| 2,494,968 | Schlesinger et al. | Jan. 17, 1950 |
| 2,545,633 | Schlesinger et al. | Mar. 20, 1951 |
| 2,829,950 | Cunningham | Apr. 8, 1958 |

OTHER REFERENCES

Schechter: "The Preparation of Pentaborane and the Evaluation of the Hazards of Handling Diborane and Pentaborane," Final Report Navy Contract N02(s) 9973 Bureau of Aeronautics, printed by Mine Safety Appliances Co., Dec. 1, 1950, declassified May 11, 1954.

(Other references on following page)

OTHER REFERENCES

Brown et al.: "Journal of the American Chemical Society," vol. 75, pp. 192–195, Jan. 5, 1953.

Progress Report, Contract N02(s) 9901, Bureau of Aeronautics, period covered: Aug. 23 to Oct. 23, 1949, printing date Oct. 23, 1949, declassified Nov. 5, 1953, p. 5.

Schechter et al.: "Boron Hydrides and Related Compounds," prepared under Contract N0a(s) 10992 for Dept. of Navy, Bureau of Aeronautics, prepared by Callery Chemical Co., declass. December 1953, p. 47.

Hoekstra: The Preparation and Properties of Alkali Metal Borohydrides," AECD 2144, declassified Sept. 19, 1947, page 4.